United States Patent [19]

Kuroiwa

[11] Patent Number: 4,799,807
[45] Date of Patent: Jan. 24, 1989

[54] ROLLING BEARING WITH ROLLING RETAINERS

[76] Inventor: Kazuo Kuroiwa, 750-186, Shirane-cho, Yokahama-shi, Kanagawa-ken, Japan

[21] Appl. No.: 150,547

[22] Filed: Jan. 26, 1988

Related U.S. Application Data

[63] Continuation-in-part of Ser. No. 108,778, Oct. 15, 1987.

[30] Foreign Application Priority Data

Oct. 15, 1986 [JP] Japan .................. 61-243071
Sep. 10, 1987 [JP] Japan .................. 62-226869
Nov. 19, 1987 [JP] Japan .................. 62-292782

[51] Int. Cl.[4] .................. F16C 33/10; F16C 19/20; F16C 19/40
[52] U.S. Cl. .................. 384/462; 384/474; 384/522; 384/553
[58] Field of Search .............. 384/450, 462, 465, 470, 384/472, 474, 520–523, 551–555, 572, 524

[56] References Cited

U.S. PATENT DOCUMENTS 1,205,449  11/1916  Hart ........................ 384/553
1,262,337   4/1918  Hart ........................ 384/553
1,282,888  10/1918  Lippincott .................. 384/522
4,174,141  11/1979  Reiss ....................... 384/554

Primary Examiner—Daniel P. Stodola
Assistant Examiner—Thomas R. Hannon
Attorney, Agent, or Firm—Wegner & Bretschneider

[57] ABSTRACT

A rolling bearing in which a plurality of rolling members are interposed between an outer race and an inner race, further comprising: a plurality of generally cylindrical rolling retainers, one disposed between each adjacent pair of the rolling members to keep them apart, each comprising a pair of annular grooves provided adjacent to either axial end thereof and a pair of circular flanges provided at either axial end thereof; a pair of cover members, one located at each axial end of the rolling bearing and mounted to one of the two races to define a support rail coaxial with the rolling bearing, each of the support rails having a circumferential surface on the one radial side thereof on which the rolling retainers roll at their circular flanges; a pair of free rings, each having a circumferential surface on the other radial side thereof on which the rolling retainers roll at their annular grooves; and a lubricant ejection hole extending in an axial end portion of at least one of the rolling retainers from an opening in an axial end thereof to another opening in an outer circumferential surface thereof for forming a film of lubricant in regions of contact between the rolling retainer and one of the support rails and/or the adjacent rolling members.

11 Claims, 10 Drawing Sheets

ROLLING BEARING WITH ROLLING RETAINERS

This application is a continuation-in-part of application Ser. No. 108,778, filed Oct. 15, 1987.

TECHNICAL FIELD

The present invention relates to a rolling bearing in which rolling members consisting of balls or rollers are interposed between an inner race and an outer race and the rolling members are spaced apart by means of rolling retainers which are shaped as rollers.

BACKGROUND OF THE INVENTION

Rolling bearings which are reduced in frictional resistance by interposing balls or rollers between an outer race and an inner race have been known from the past and in such rolling bearings a retainer cage is typically interposed between the balls or the rollers so as to reduce the frictional forces arising from direct contact between the balls or the rollers.

However, even though a conventional retainer cage is quite capable of retaining the balls or the rollers at an equal interval between an outer race and an inner race, it necessarily rotates around the center of rotation of the bearing, interposed between the inner race and the outer race, involving some rubbing motion relative to the balls or rollers, the inner race and the outer race which surround the retainer cage. This rubbing motion causes some frictional resistance to the relative rotation between the inner race and the outer race. Thus, this friction increases the frictional torque, and, in particular in high speed ranges, considerable heat is generated in contact regions, with the result that power is lost, the contact regions are excessively worn out, and temporary destruction of oil film may occur, these leading to various problems such as the loss of fatigue durability of the bearing and so on.

BRIEF SUMMARY OF THE PRESENT INVENTION

In view of such problems of the prior art, a primary object of the present invention is to provide a rolling bearing which is superior in fatigue durability, involves very little power loss and is highly wear resistant by accomplishing the contact between the rolling retainers and the balls or the rollers, the inner race and the outer race which surround the rolling retainers solely with rolling contact instead of rubbing contact, to the end of reducing friction torque and reducing heat generation.

Another object of the present invention is to provide a rolling bearing in which rolling members can float in relation with the inner race and the outer race.

A yet further object of the present invention is to provide a rolling bearing having good lubrication characteristics.

A yet further object of the present invention is to provide a rolling bearing which produces low levels of noise and vibration.

A yet further object of the present invention is to provide a rolling bearing which is highly durable.

According to the most general aspect of the present invention, these and other objects are attained by providing a rolling bearing in which a plurality of rolling members are interposed between an outer race and an inner race, further comprising: a plurality of generally cylindrical rolling retainers, one disposed between each adjacent pair of the rolling members to keep them apart, each comprising a pair of annular grooves provided adjacent to either axial end thereof and a pair of circular flanges provided at either axial end thereof; a pair of cover members, one located at each axial end of the rolling bearing and mounted to one of the two races to define a support rail coaxial with the rolling bearing, each of the support rails having a circumferential surface on the one radial side thereof on which the rolling retainers roll at their circular flanges; a pair of free rings, each having a circumferential surface on the other radial side thereof on which the rolling retainers roll at their annular grooves; and a lubricant ejection hole extending in an axial end portion of at least one of the rolling retainers from an opening in an axial end thereof to another opening in an outer circumferential surface thereof.

Preferably, the lubricant ejection hole is provided with a diametric hole laterally extending through the axial end portion of the corresponding rolling retainer and an axial hole extending between an axial opening provided in a central part of the axial end of the rolling retainer and a middle part of the diametric hole, the diametric hole serving as a lubricant outlet passage while the axial hole serves as a lubricant inlet passage. The lubricant outlet passage may extend to the regions of contact in relation with the support rails and/or the adjacent rolling members. Additionally, means for impelling lubricant through the space defined between the inner race and the outer race may be provided for favorable lubrication results.

According to a certain aspect of the present invention, a certain degree of play is provided in the radial direction between the support rails of the cover members and the circular flanges of the rolling retainers and/or between the free rings and the annular grooves of the rolling retainers whereby the rolling retainers can completely float in relation with the inner race and the outer race.

According to another aspect of the present invention, the center line of each of the rolling retainers and the loci of symmetry of the pair of the rolling members adjacent thereto are all substantially coplanar whereby the radial positions of the rolling retainers are kept stable.

According to a yet further aspect of the present invention, the central portion of the longitudinal cross sectional shape of each the rolling retainers is concaved facing outwards. The radius of curvature of the central portion of its longitudinal cross sectional shape is either smaller or greater than the radius of curvature of the longitudinal cross sectional shapes of the pair of the rolling members adjacent thereto. In either case, the rolling retainers are prevented from skewing.

According to a yet further aspect of the present invention, the thickness of the free rings at their portions remote from where they contact the annular grooves of the rolling retainer is made greater that the thickness of the free rings at their portions proximate to where they contact the annular grooves of the rolling retainers for greater mechanical strength of the free rings.

DETAILED DESCRIPTION OF THE PREFERRED EMBODIMENTS

Figure 1:
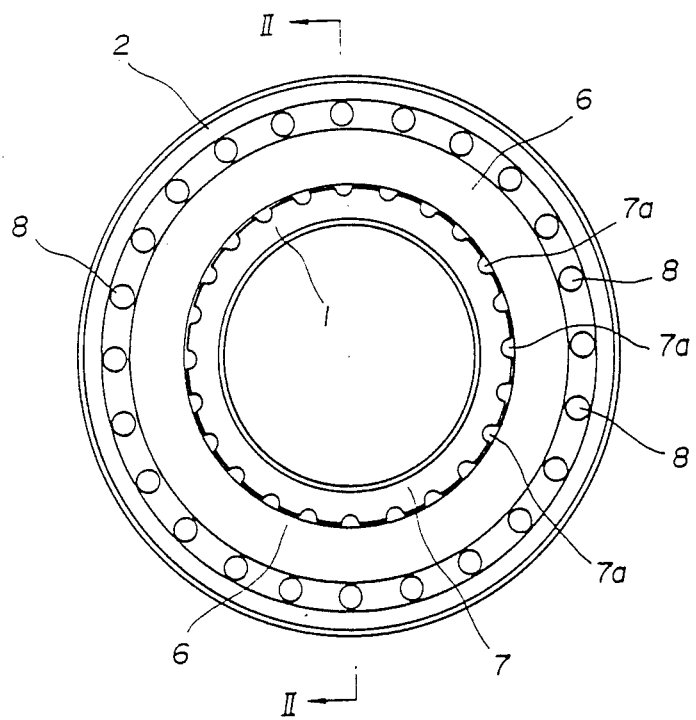
FIG. 1 is a side view of an embodiment based on the first concept of the present invention.
Figure 2:
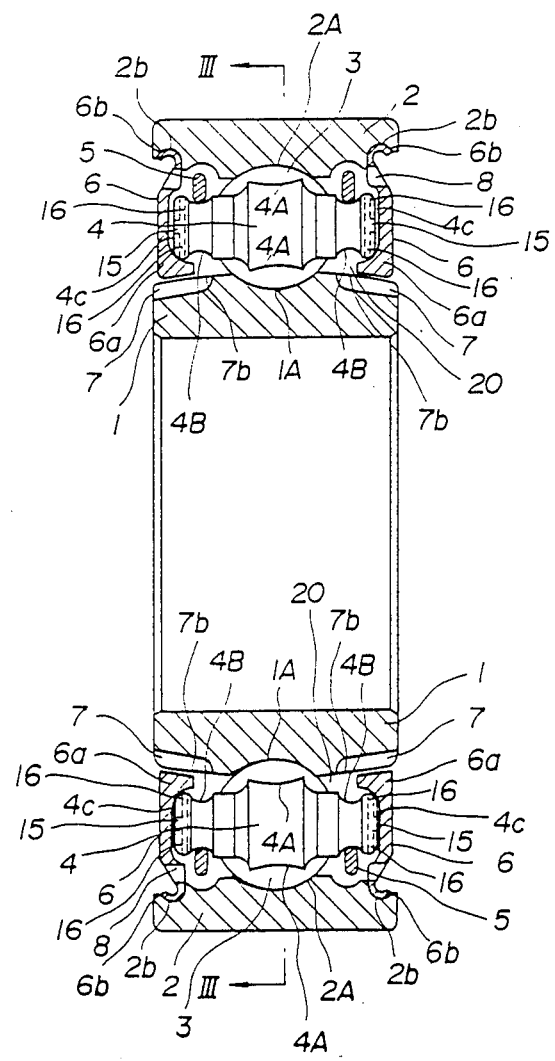
FIG. 2 is a sectional view taken along line II—II of FIG. 1.
Figure 3:
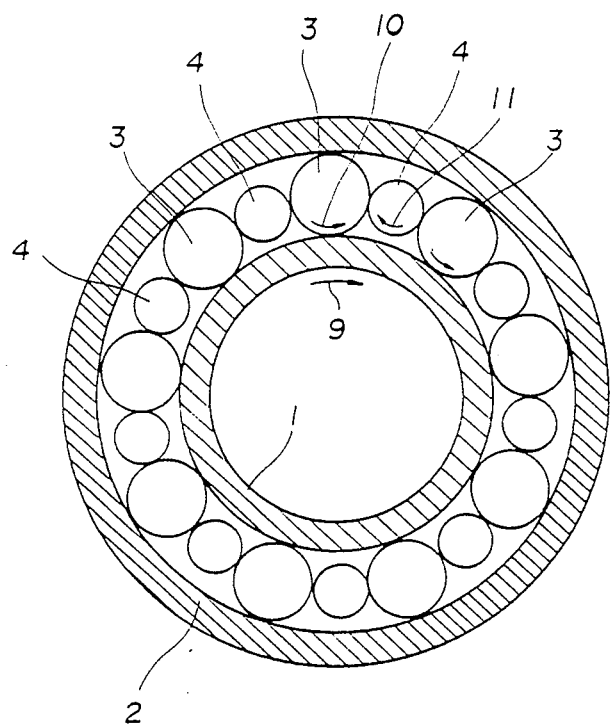
FIG. 3 is a sectional view taken along line III—III of FIG. 2.
Figure 4:
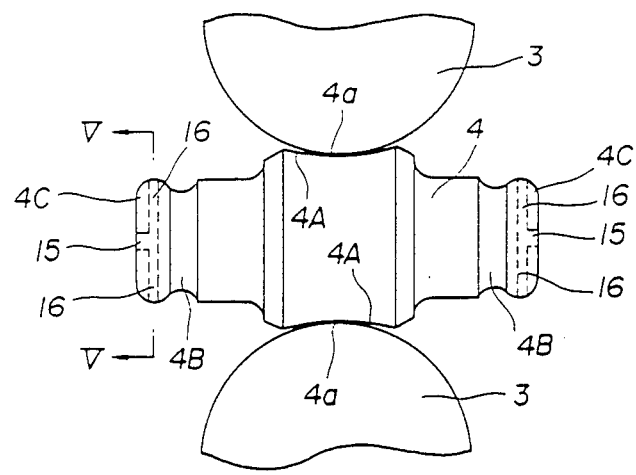
FIG. 4 shows a rolling retainer having lubricant passages, interposed between an adjacent pair of the rolling members.
Figure 5:
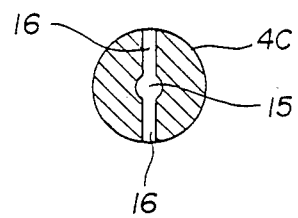
FIG. 5 is a sectional view taken along line V—V of FIG. 4.

Now a first embodiment of the present invention is described in greater detail in the following with reference to FIGS. 1 to 5. FIG. 1 is a side view of a rolling bearing according to the present invention; FIG. 2 is a sectional view taken along line II—II of FIG. 1; FIG. 3 is a sectional view taken along line III—III of FIG. 2; FIG. 4 shows a rolling retainer having lubricant passages, interposed between an adjacent pair of the rolling members; and FIG. 5 is a sectional view taken along line V—V of FIG. 4.

Numeral 1 denotes an inner race through which a rotary shaft not shown in the drawings is passed. An outer race 2 is arranged around the outer circumference of the inner race 1 at a certain distance therefrom so as to oppose each other with their opposing depressions 1A, 2A defined in their central regions and retain a plurality of balls 3 between these depressions 1A and 2A at equal interval and by way of rolling retainers 4.

Each of the rolling retainers 4 which are disposed between the balls 3 is shaped like a roller and is provided with a depression 4A in its central part and fine grooves 4B in its either side end portion. Further, circular contact regions 4C are provided adjacent to the fine grooves 4B.

Numeral 15 denotes a pair of lubricant inlet passages which open from corresponding axial ends of the rolling retainer 4. Each of the lubricant axial passages 15 joins into a middle part of a lubricant outlet passage 16 which extends diametrically across the corresponding axial end portion of the rolling retainer 4.

Numerals 6 denote a pair of covers which are fitted over either end of the opening defined between the inner race 1 and the outer race 2, and engagement portions 6b of the covers 6 are press fitted into semi-circular engagement grooves 2b provided on either end of the outer race 2 to put the covers 6 integral with the inner race 1.

The inner edge of each cover 6 is curved inward defining a support rail 6a which contacts the contact region 4C of the rolling retainer 4 (See FIG. 2). In other words, the rolling retainers 4 roll over the support rails 6a fixed to the outer race 2, with their contact regions 4C.

A circular free ring 5 is engaged with each fine groove 5 provided on either end of each rolling retainer 4 and the rolling retainers 4 roll over the inner circumferential surfaces of the free rings 5 without slipping, thus rotating together with the free rings 5 about the center of rotation of the rolling bearing.

The outer diameter of the support rails 6a is slightly smaller than the inner diameter of the trajectory of the rotation of the contact regions 4C of the retainers 4.

The radius of curvature of the depression 1A of the inner race 1 and the depression 2A of the outer race 2 is slightly greater than the diameter of the balls 3 and a certain gap is defined between the balls and the two races.

According to the present embodiment, a plurality of cylindrical fluid injection inlets 7a provided along the side ends of the inner race 1 define vanes 7 (See FIG. 1). These injection inlets 7a are provided by forming notches in part of the outer circumferential surface of the inner race 1 substantially in parallel with the support rails 6a which form a part of the covers 6 and the end surface 7b of each notch leads to the interior 20 of the bearing defined by the inner race 1, the outer race 2 and the covers 6 and including the rolling retainers 4. In other words, as the rotary shaft not shown in the drawings turns, the vanes 7 provided along the side ends of the inner race 1 also turns with the result that the head of the fluid around them is increased and the fluid including lubricating oil is introduced into the interior of the bearing.

Further, part of the lubricant introduced into the interior 20 of the rolling bearing flows axially into the lubricant inlet passages 15 of the rolling retainers 4 and is ejected radially and outwardly from the lubricant outlet passages. Thus, as the rotational speed of the rolling retainers 4 increases, the head of the surrounding lubricant is increased and a lubricant film or wedge is formed between the rolling retainers 4 and the support rails 6a.

Meanwhile, the part of the covers 6 adjacent to the outer race is provided with a plurality of fluid outlets 8 along the circumferential direction at equal intervals and since these outlets 8 are passed through the covers 6 the fluid in the interior 20 of the bearing can be expelled from these outlets 8 after it has accomplished its purpose.

According to the present embodiment, the vanes 7 and the outlets 8 are provided on either side face of the bearing, but it is also possible to provide them only on one side of the bearing. The choice depends on how the fluid is to be circulated.

The action of the rolling bearing of the above described structure is now described in the following.

As described above, the rolling retainers 4 are supported at their outer surfaces by the inner circumference of the free rings 5 by point contact without slipping; the inner surfaces of the rolling retainers 4 are supported by the support rails 6a provided in the covers 6 by rolling over the latters without slipping; and the rolling retainers 4 can roll between the inner race 1 and the outer race 2 maintaining a certain gap in relation with the inner race 1 and the outer race 2.

Therefore, as the rotary shaft which is not shown in the drawings but is passed through the inner race 1 turns, the inner race 1 turns accordingly and the balls 3 disposed between the inner race 1 and the outer race 2 rotate while revolving around themselves. The rolling retainers 4 likewise rotate while revolving around themselves in the same way as the balls 3. In other words, as shown in FIG. 3, as the inner race 3 rotates in the direction of the arrow 9, the balls 3 revolve in the direction of the arrow 10 while the rolling retainers 4 revolve in the direction of the arrows 11.

As described above, the rolling retainers 4 are supported at their outer surfaces by the inner circumference of the free rings 5 and at their inner surfaces by the support rails 6a by way of their fine grooves 4B and the regions of contact 4C, and both rotate and revolve around themselves while maintaining a certain gap in relation with the inner race 1 and the outer race 2.

According to the present embodiment, the radius of curvature of the cross section of the depression 4A provided in the rolling retainer 4 including the central axial line of the rolling retainer 4 (in other words, the radius of curvature of the cross section including the center of the revolution of the rolling retainer around itself) is slightly greater than the radius of the balls 3. Therefore, since the ball 3 and the rolling retainer 4a contact each other at a single point 4a, the rolling resistance is reduced and, when the bearing is used for high speed rotation, since the rolling retainers 4 are biased outwardly by the centrifugal force the axial line of the rolling retainer 4 is always maintained perpendicular to the direction of the rotational motion and the occurrence of skewing is prevented.

Furthermore, the free rings 5 are engaged to the fine grooves 4B provided on either end of each rolling retainer 4 adjacent to the outer race 1 and supported by the fine grooves by point contact so that the free rings 5 would not move in the direction of the axial lines of the rolling retainers 4.

Thus, the rolling retainers 4 rotate, contacting and rolling over the inner circumferential surfaces of the free rings without slipping, while maintaining a certain distance in relation with the outer race 2. In this conjunction, the free ring 5 receives a centrifugal force arising from the rotation of the rolling retainers as well as a centrifugal force arising from its own revolution and is subjected to a tensile force due to these centrifugal forces. The rolling retainers 4, 4 revolve around themselves and rotate along a circle centered around a central line as a group.

The inner faces of the rolling retainers 4 contact the support rails by way of their contact regions 4C provided with their either ends each at a point. The rolling retainers 4 roll over the support rails 6a without slipping. As the rotational speed of the rolling retainers 4 increases, the head of the surrounding lubricant is increased and the lubricant is fed into the lubricant inlet passages 15 and the lubricant outlet passages 16 with the result that the lubricant ejected radially from the lubricant outlet passages 16 forms a film of lubricant in the regions of contact between the rolling retainers 4 and the support rails 6a, and the rolling retainers 4 are thus made to completely float as they rotate. To accomplish this, the outer diameter of the support rails 6a is made slightly smaller than the inner diameter of the trajectory of the rotation of the contact regions 4C of the retainers 4 so that the rolling retainers 4 may rotate while maintaining a certain distance in relation with the support rails 6a when the rolling retainers 4 apply their centrifugal forces upon the free rings 5 as the rolling retainers 4 roll.

Meanwhile, the support rails 6a let the rolling retainers 4, 4 rotate softly by way of point contacts between the rolling retainers 4 and the support rails 6a and, additionally, automatically align the center lines of revolution of the rolling retainers 4.

Thus, the inner sides of the rolling retainers 4 while rotating roll over the support rails 6a without slipping while the outer sides of the rolling retainers 4 likewise roll over the free rings 5 without slipping with the result that the rolling retainers 4 revolve around themselves and rotate around a center which is automatically aligned and the rolling retainers 4 and the free rings 5 can roll in a completely floating state without involving any substantial friction.

A bearing of this type is typically used as a bearing for a turbo compressor or the like which is coupled to a motor and is often used in an enclosed environment filled with fluid. In such a case, as the vanes 7 provided on either side of the inner race 1 rotate, the pressure head of the surrounding fluid is raised and the fluid is spontaneously drawn into the bearing from the inlets 7a. When the pressure in the bearing 20 has risen to a certain level by the introduction of the fluid, the part of the fluid which has served its purpose is spontaneously expelled from the outlets 8. The fluid typically consists of a mixture of liquefied gas and lubricating oil and if the fluid contains lubricating oil an oil mist lubrication takes place automatically. Thus, since oil films will be formed in various areas of contact in the interior 20 of the bearing, not only the rolling of the various parts involves less friction and the durability of the rolling parts is improved but also the cushioning effect of the films of lubricating oil causes an even softer action of aligning the centers of the rolling retainers 4 and positioning them.

Since the oil film between the rolling retainers 4, the balls 3, the support rails 6a and the free rings 5 fill the gaps between mutually contacting parts and applies pressure thereto and plays in various parts can be eliminated, the operation of the bearing will be smoother with less noise and vibration.

In the above described embodiment, the lubricant outlet passages 16 were provided adjacent to the parts of the rolling retainers 4 where they contact the support rails 6a, the lubricant outlet passages may extend to the regions of the rolling retainers 4 where they contact the adjacent balls 3 as denoted with numeral 16A. Thus, in this modified embodiment, a lubricant film or a lubricant wedge is formed not only between the rolling retainers 4 and the support rails 6a but also between the rolling retainers 4 and the adjacent balls 3 with the result that the automatic alignment of the rolling retainers in relation with the center of rotation of the rolling bearing as well as in relation with the centers of rotation of the rolling retainers 4 and the rolling bearing can, in turn, involving very low levels of noise and vibration.

In the above described embodiment, a tensile force is produced in the free rings 5 due to the centrifugal forces arising from the rotation of the free rings 5 and the rolling retainers 4. On the other hand, in the embodiment which is described in the following as illustrated in FIG. 8, the cross sectional are of the free rings 5 is advantageously locally increased to give the free rings a greater margin in withstanding the tensile force.

In this example, the outer side of each of the free rings 5A has a greater sectional area and can withstand a greater tensile force.

Figure 8:
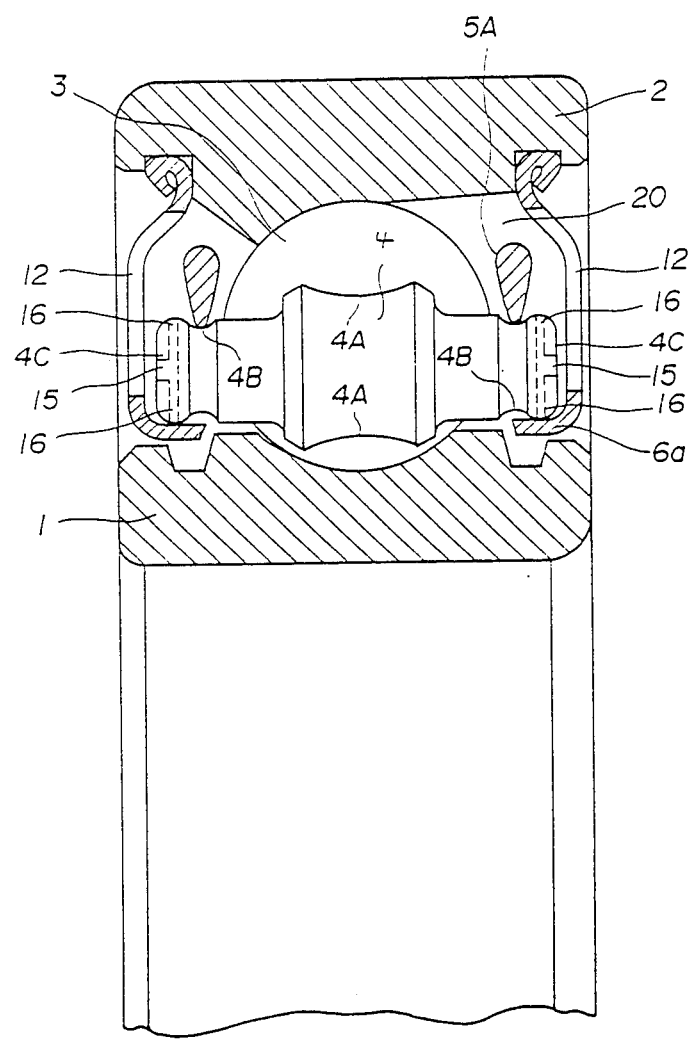
FIG. 8 is a cross sectional view of the free ring which is greater in cross sectional area on the side of the outer race.

The embodiment given in FIG. 8 is an example of an open type bearing which is provided with large-diameter openings 12 between the inner race 1 and the outer race 2 and, as opposed to the previous embodiment, an oil mist lubrication takes place spontaneously due to the presence of the large-diameter openings 12.

In the embodiment shown in FIG. 8, the contact region 4C between each rolling retainer 4 and each support rail 6a is not a point as in the previous embodiment but a plane which is parallel with the center lines of revolution of the rolling retainers 4. In this case, the direction of the centers of revolution of the rolling retainers 4 is automatically and smoothly aligned because an oil film formed between the balls 3 and the rolling retainers 4 serves as a cushion.

Thus, the support rails 6a are designed to keep the rolling retainers 4 from moving as a group and, due to the cushioning effect of the oil film formed from the lubricant supplied from the lubricant outlet passages 16, the centers of revolution of the rolling retainers are automatically aligned in a soft manner.

Figure 7:
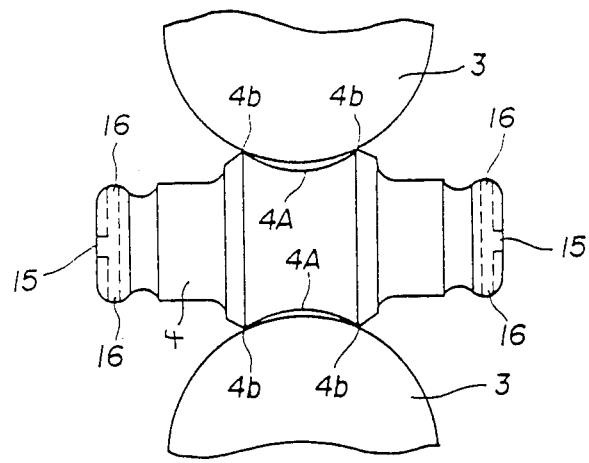
FIG. 7 shows a mode of contact between one of the rolling retainer and the adjacent rolling members when the radius of curvature of the depression of the rolling retainer is greater than the radius of the adjacent balls.

In the above described embodiment, a point contact was accomplished by making the radius of curvature of the cross section including the center line of revolution of the depression 4A of each of the rolling retainers 4 greater than the radius of the balls 3, but FIG. 7 shows an embodiment in which a two-point contact is accomplished by making the radius of curvature of the cross section including the center line of the revolution of the depression 4A of each of the rolling retainers 4 smaller than the radius of the balls 3. In this example, since each rolling retainer 4 contacts a ball 3 at two points 4b, 4b, the center line of the revolution of the rolling retainer is automatically aligned without wobbling even at low rotational speed and the center line of the rolling retainer 4 is always maintained perpendicular to the direction of the rotating motion of the rolling retainer without causing a skew.

Figure 9:
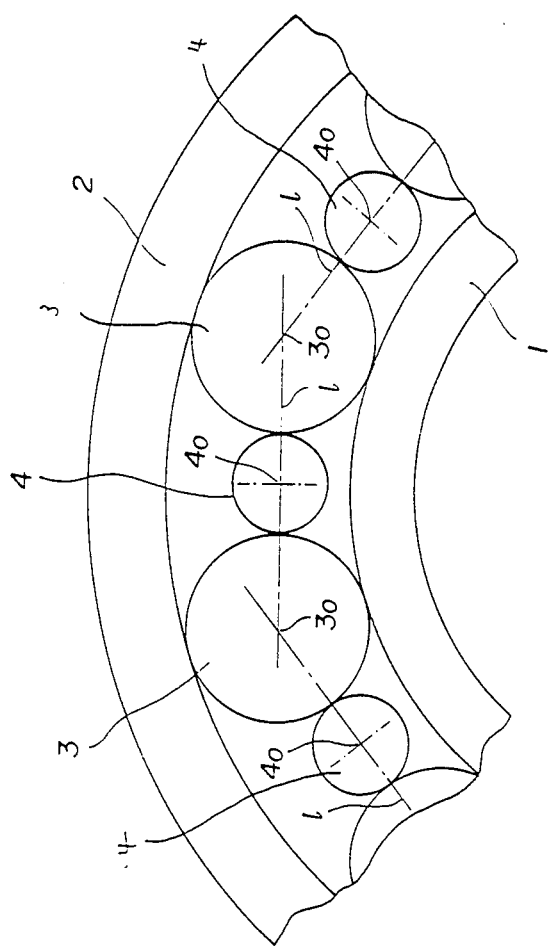
FIG. 9 is a schematic view in which the central line of revolution of each of the rolling retainers is coplanar with the center lines of revolution of the adjacent rolling members.

Next, FIG. 9 shows an example in which a center line of revolution of each rolling retainer 4 is coplanar with the center lines of revolution of the two adjacent balls. In this example, the center line 4o of the revolution of each of the rolling retainers 4 is arranged on a plane 1 which connects the center lines 3o of revolution of the two adjacent balls 3. Thus, by setting the center line 4o of the revolution of each of the rolling retainers 4 in the plane 1 which includes the center lines 3o of revolution of the two adjacent balls 3, even when the rolling retainer 4 are subjected to an instantaneous compression force from the adjacent balls 3, the compression force acts only in the direction of the center lines 4o of the rolling retainers 4 and not in the direction to cause the rolling retainers 4 to be displaced either towards the outer race 1 or towards the inner race 2 with the result that the trajectory of the rotation of the rolling retainers 4 would not be disturbed.

Figure 10:
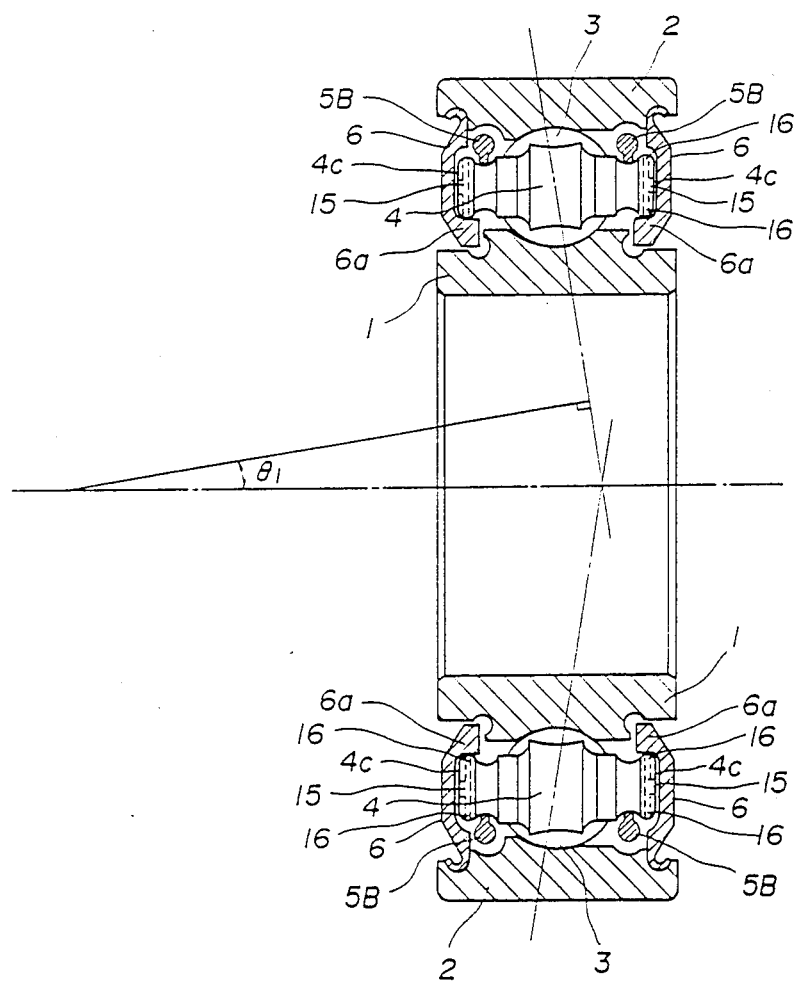
FIGS. 10 through 12 are cross sectional views of other embodiments of the rolling bearing of the present invention.

FIG. 10 shows an embodiment of an angular contact ball bearing for high speed rotation and is of a shielded type. Lubrication is based on grease lubrication. In this example, temperature rise due to friction would not happen because the rolling action intervenes. Therefore, grease lubrication is possible even at high rotational speed; deterioration of the material due heat can be avoided; and the durability of the rolling parts is improved. Also, since the contact angle theta 1 is small in this embodiment, the center lines of the revolution of the rolling retainers 4 are parallel to the center line of the rotation of the rolling retainers 4 in the same way as the first embodiment. Moreover, in this embodiment, the part of the cross section of each of the free rings 5B adjacent to the outer race is circular and is greater so as to increase its capability to withstand the tensile force. The surface of each of the rolling retainers 4 which contacts the support rail 6a provided in the cover 6 is made to be parallel with the center of the revolution of the rolling retainer 4 to be capable of rolling lightly at high rotational speed.

As described above, according to the above described embodiments, since the rolling retainers 4 only make light contacts and undergo a rolling motion which involves relatively small friction, even though the bearing is lubricated by grease lubrication, it would not involve any material deterioration due to heat generation and is capable of high speed rotation.

Figure 11:
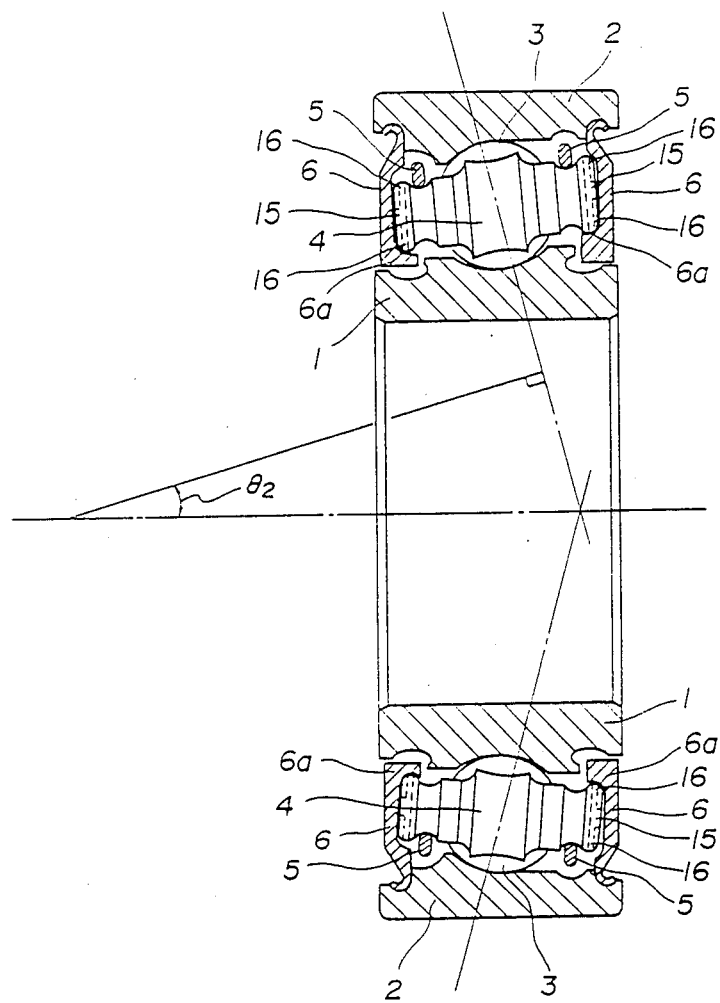

FIG. 11 shows an embodiment of an angular contact ball bearing, which is shielded and grease lubricated, involving a large contact angle. In this embodiment, since the contact angle theta 2 is great, the center lines of revolution of the rolling retainers are also inclined. Since the rolling retainers 4 are in contact with the the support rails 6a and a smooth contact is accomplished therebetween, thus permitting a low noise, low vibration operation. In this way, the present embodiment is capable of high speed rotation even though lubricated by grease.

It goes without saying that cylindrical rollers can be used in place of the balls 3.

Figure 12:
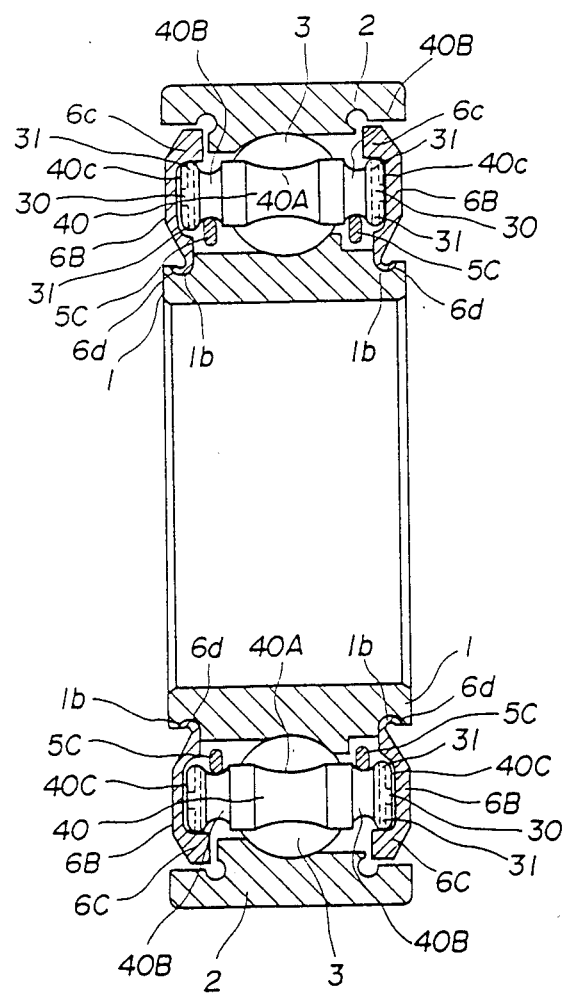

Now an embodiment based on the second concept of the present invention is described in the following with reference to FIG. 12.

In this embodiment, the covers 6B, 6B are integrally attached to the inner race 1 by being press fitted into semi-circular engagement grooves 1b provided on either side of the inner race 1 opposite to the outer race, and the covers 6B, 6B define support rails 6c, 6c with their portions adjacent to the outer race being curved inwardly so that the contact portions 40C, 40C of the rolling retainers 4 engage the support rails 6c, 6c from the side of the inner race. Therefore, as opposed to the embodiments based on the first concept of the present invention, the support rails 6c are provided on the outer race while the free rings 5C are so arranged as to engage the fine grooves 40B, 40B of the rolling retainers 40 from the side of the inner race. A pair of lubricant inlet passages 30 which open from corresponding axial ends of the rolling retainers 4 are provided adjacent to the contact regions 40C and each the lubricant inlet passages 30 joins into a middle part of a lubricant outlet passage 31 which extends diametrically across the corresponding axial end portion of the rolling retainer 4.

In this embodiment based on the second concept of the present invention, as opposed to the embodiments based on the first concept of the present invention, since the inner race side of the rolling retainers 40 roll over the outer circumference of the free rings 5C while the outer race side thereof roll along and is supported by the support rails 6c, the shape of the rolling retainers 40 is slightly different from that of the rolling retainers 4 of the embodiments based on the first concept of the present invention.

Thus, according to the second concept of the present invention, the outer race sides of the rolling retainers 40 roll over and are supported by the support rails 6c without slipping by way of the contact regions 40C. And, as the rotational speed of the rolling retainers 40 increases, the head of the surrounding fluid is increased and the rolling retainers 40 are made to float as a result of formation of a lubricant wedge between the rolling retainers 40 and the support rails 6c. In this condition, the inner race side of the rolling retainers 40 rolls on the outer circumferential surfaces of the free rings 5C by point contact without slipping. Therefore, as opposed to the first concept of the present invention, even though the rolling retainers 40 are supported by the support rails 6c which are fixed to the outer race, the rolling retainers 40 float by virtue of the mentioned head of the lubricant as they roll. In other words, according to the second concept of the present invention, the contact regions 40C of the rolling retainers 40 are supported by the support rails 6c of the covers 6B, but since they are not in contact with the inner race 1 or the outer race 2, the friction torque is much reduced as compared to the prior art bearings.

It goes without saying that the various modifications of the first concept of the present invention are equally applicable to the second concept of the present invention.

As a matter of fact, the second concept of the present invention can be embodied as angular contact ball bearings, shielded and grease lubricated, which is capable of high speed rotation.

Figure 6:
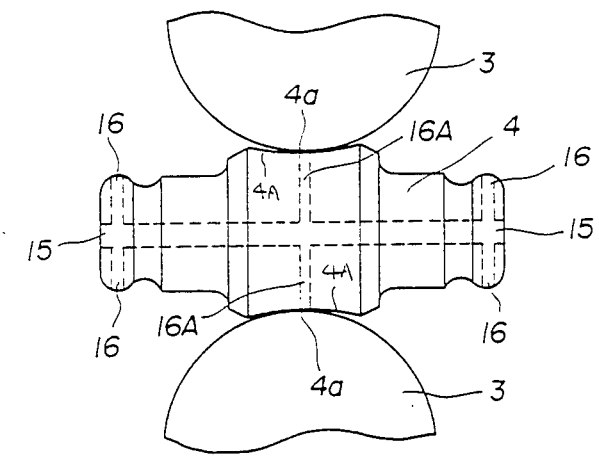
FIG. 6 is a view similar to FIG. 4 showing a rolling retainer having lubricant passages extending to the regions of contact.

Specifically, in the same way as in the embodiment shown in FIG. 6, the lubricant outlet passages may extend to the regions of the rolling retainers 40 where they contact the adjacent balls 3 as denoted with numeral 16A, and, in the same way as in the embodiment shown in FIG. 9, the center of revolution of each of the rolling retainer 40 can be placed on the line connecting the centers 3o, 3o of revolution of the two adjacent balls 3, 3.

Further, in the same way as in the embodiments shown in FIGS. 4 and 7, the radius of curvature of the depression 40A of each of the rolling retainers 40 may be either smaller or greater than the radius (or the radius of curvature of the cross section of the adjacent balls 3 including the center line of the revolution thereof). Also, in the same way as in the embodiment shown in FIG. 8, the cross section of each of the free rings 5C may be made greater on the side of the inner race than on the side of the outer race.

In the same way as in the embodiment shown in FIG. 2, it is possible to provide vanes 7 for feeding fluid into the interior 20 of the bearing and outlets 8 for expelling the fluid after it has been used. And this fluid may be liquefied gas, lubrication oil and so on. If the fluid contains any lubricating oil, an oil mist lubrication will be automatically accomplished.

It is also possible to set the outer diameter of each of the free rings 5C slightly smaller than the inner diameter of the trajectory of the rotational motion of the fine grooves 40B.

It is obvious that cylindrical rollers can be used in place of the balls 3 in the embodiments based on the second concept of the present invention.

If the rolling retainers 4, 40 are made of wear resistant and light material to a possible extent and if elastic material is used in the regions where contacts take place while the rolling motion of the relevant parts continues, smoother operation of the bearing will be possible.

Further, the lubricant outlet passages may extend in three or more directions from the centers of the rolling retainers, instead of two directions as was the case in the embodiment shown in FIG. 5.

As described above, according to the first concept of the present invention, since the rolling bearing comprises rolling retainers which are supported by fixed support rails provided on the side of the inner race and free rings provided on the side of the outer race and the lubricant outlet passages are provided in the contact regions in relation with the support rails and/or the adjacent balls, as the rolling retainers roll, the centrifugal force due to the rotation of the rolling retainers is applied to the free rings and the rolling retainers rotate while maintaining a certain gap from the support rails between the outer race and the inner race in a completely floating state along with the free rings. Therefore, in the bearing according to the present invention, the friction torque is reduced, less heat is generated, fatigue durability of various rolling parts is improved, the power loss is less, and the wear property is improved.

As described above, according to the second concept of the present invention, since the rolling bearing comprises rolling retainers which are supported by free rings provided on the side of the inner race and fixed support rails provided on the side of the outer race, as the rolling retainers roll, the rolling retainers are slightly spaced apart from the support rails at high speed rotation and the inner race and the outer race are not in mutual contact in the same way as in the embodiments based on the first concept of the present invention.

Therefore, as compared to the prior art bearing structures, the rolling bearing of the present invention offers the advantages of less friction torque, less heat generation, greater fatigue durability, less power loss, and greater wear resistance.

Although the present invention has been shown and described with reference to the preferred embodiments thereof, it should not be considered as limited thereby. Various possible modifications and alterations could be conceived of by one skilled in the art to any particular embodiment, without departing from the scope of the invention.

What we claim is:

1. A rolling bearing in which a plurality of rolling members are interposed between an outer race and an inner race, further comprising:
    a plurality of generally cylindrical rolling retainers, one disposed between each adjacent pair of the rolling members to keep them apart, each comprising a pair of annular grooves provided adjacent to either axial end thereof and a pair of circular flanges provided at either axial end thereof;
    a pair of cover members, one located at each axial end of the rolling bearing and mounted to one of the two races to define a support rail coaxial with the rolling bearing, each of the support rails having a circumferential surface on the one radial side thereof on which the rolling retainers roll at their circular flanges;
    a pair of free rings, each having a circumferential surface on the other radial side thereof on which the rolling retainers roll at their annular grooves; and
    a lubricant ejection hole extending in an axial end portion of at least one of the rolling retainers from an opening in an axial end thereof to another opening in an outer circumferential surface thereof.

2. A rolling bearing as defined in claim 1, wherein the lubricant ejection hole is provided with a diametric hole laterally extending through the axial end portion of the corresponding rolling retainer and an axial hole extending between an axial opening provided in a central part of the axial end of the rolling retainer and a middle part of the diametric hole, the diametric hole being provided with an opening adjacent to a region of contact between the corresponding rolling retainer and one of the support rails.

3. A rolling bearing as defined in claim 1, wherein the lubricant ejection hole is provided with a diametric hole laterally extending through the axial end portion of the corresponding rolling retainer and an axial hole extending between an axial opening provided in a central part of the axial end of the rolling retainer and a middle part of the diametric hole, the diametric hole being provided with an opening adjacent to a region of contact between the corresponding rolling retainer and the adjacent rolling members.

4. A rolling bearing as defined in claim 1, wherein a certain degree of play is provided in the radial direction between the support rails of the cover members and the circular flanges of the rolling retainers.

5. A rolling bearing as defined in claim 1, wherein a certain degree of play is provided in the radial direction between the free rings and the annular grooves of the rolling retainers.

6. A rolling bearing as defined in claim 1, wherein the center line of each of the rolling retainers and the loci of symmetry of the pair of the rolling members adjacent thereto are all substantially coplanar.

7. A rolling bearing as defined in claim 1, wherein the central portion of the longitudinal cross sectional shape of each the rolling retainers is concaved facing outwards.

8. A rolling bearing as defined in claim 7, wherein, for each of the rolling retainers, the radius of curvature of the central portion of its longitudinal cross sectional shape is greater than the radius of curvature of the longitudinal cross sectional shapes of the pair of the rolling members adjacent thereto.

9. A rolling bearing as defined in claim 7, wherein, for each of the rolling retainers, the radius of curvature of the central portion of its longitudinal cross sectional shape is smaller than the radius of curvature of the longitudinal cross sectional shapes of the pair of the rolling members adjacent thereto.

10. A rolling bearing as defined in any one of claims 1 through 7, wherein the thickness of the free rings at their portions remote from where they contact the annular grooves of the rolling retainer is greater than the thickness of the free rings at their portions proximate to where they contact the annular grooves of the rolling retainers.

11. A rolling bearing as defined in any one of claims 1 through 7, further comprising means for impelling lubricant through the space defined between the inner race and the outer race.

* * * * *